(12) United States Patent
Katagiri et al.

(10) Patent No.: US 8,810,944 B1
(45) Date of Patent: Aug. 19, 2014

(54) DYNAMIC BUFFER SIZE SWITCHING FOR BURST ERRORS ENCOUNTERED WHILE READING A MAGNETIC TAPE

(71) Applicant: International Business Machines Corporation, Armonk, NY (US)

(72) Inventors: Takashi Katagiri, Yokohama (JP); Yuhko Mori, Yokohama (JP); Pamela R. Nylander-Hill, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/943,674

(22) Filed: Jul. 16, 2013

(51) Int. Cl.
*G11B 5/09* (2006.01)
(52) U.S. Cl.
USPC .......................................... 360/53; 369/53.44
(58) Field of Classification Search
None
See application file for complete search history.

(56) References Cited

U.S. PATENT DOCUMENTS

| | | | |
|---|---|---|---|
| 5,844,919 | A | 12/1998 | Glover et al. |
| 6,640,326 | B1 | 10/2003 | Buckingham et al. |
| 6,920,005 | B2 | 7/2005 | Yun |
| 7,624,328 | B2 | 11/2009 | Unruh |
| 7,840,872 | B2 | 11/2010 | Andersen |
| 7,987,404 | B2 | 7/2011 | Fukuda et al. |
| 8,209,693 | B2 | 6/2012 | Matsuo |
| 2005/0149819 | A1 | 7/2005 | Hwang |
| 2008/0235556 | A1 | 9/2008 | Eleftheriou et al. |
| 2009/0287956 | A1 | 11/2009 | Flynn et al. |
| 2012/0002317 | A1 | 1/2012 | Hirata et al. |
| 2012/0206831 | A1 | 8/2012 | Katagiri et al. |
| 2014/0136918 | A1 | 5/2014 | Katagiri et al. |
| 2014/0136919 | A1 | 5/2014 | Katagiri et al. |

OTHER PUBLICATIONS

U.S. Appl. No. 13/676,477, filed Nov. 14, 2012.
U.S. Appl. No. 13/676,493, filed Nov. 14, 2012.
Katagiri et al., U.S. Appl. No. 14/149,752 filed Jan. 7, 2014.
Katagiri et al., U.S. Appl. No. 14/149,758, filed Jan. 7, 2014.
Non-Final Office Action from U.S. Appl. No. 13/676,477 dated Dec. 24, 2013.
Notice of Allowance and Fee (s) Due from U.S. Appl. No. 13/676,493 dated Jan. 10, 2014.
Notice of Allowance and Fee(s) Due from U.S. Appl. No. 13/676,493 dated Mar. 14, 2014.
Katagiri et al., U.S. Appl. No. 14/199,911, filed Mar. 6, 2014.

*Primary Examiner* — Paul Huber
(74) *Attorney, Agent, or Firm* — Zilka-Kotab, PC

(57) ABSTRACT

In one embodiment, a system includes a processor and logic integrated with and/or executable by the processor, the logic configured to: read data from a data storage medium, detect an error condition in data read from the data storage medium, determine how to allocate a ring buffer into a first portion and a second portion, the ring buffer being allocated for processing normal read and/or write requests, divide the ring buffer into the first portion and the second portion, wherein the first portion is allocated for processing normal read and/or write requests, and wherein the second portion is allocated for processing ERP requests, perform ERP on the data using the second portion of the ring buffer, determine that the ERP has been completed, and unify the ring buffer after the ERP is completed and allocate an entirety of the ring buffer for processing normal read and/or write requests.

20 Claims, 10 Drawing Sheets

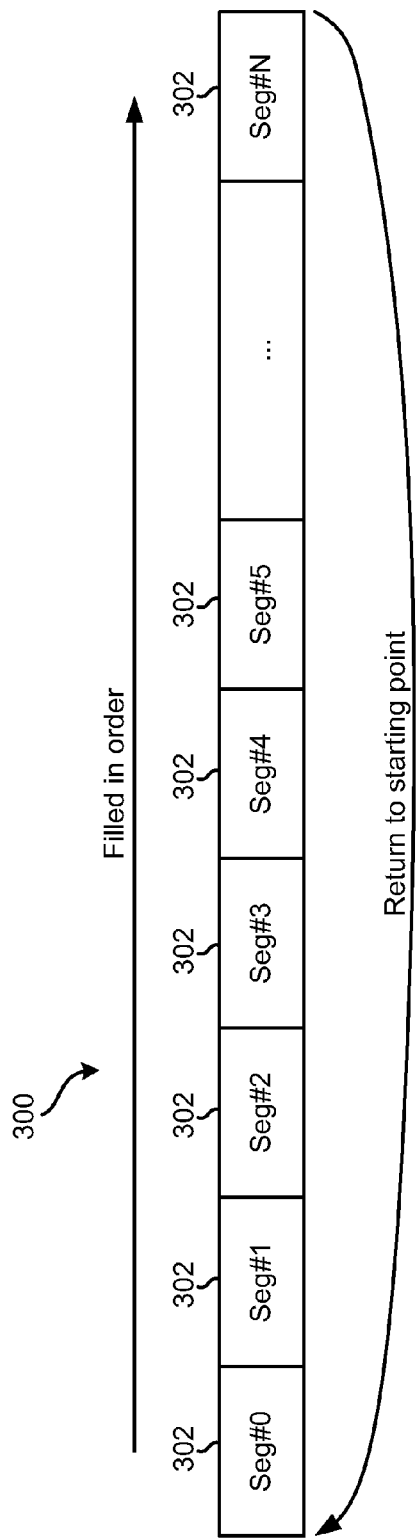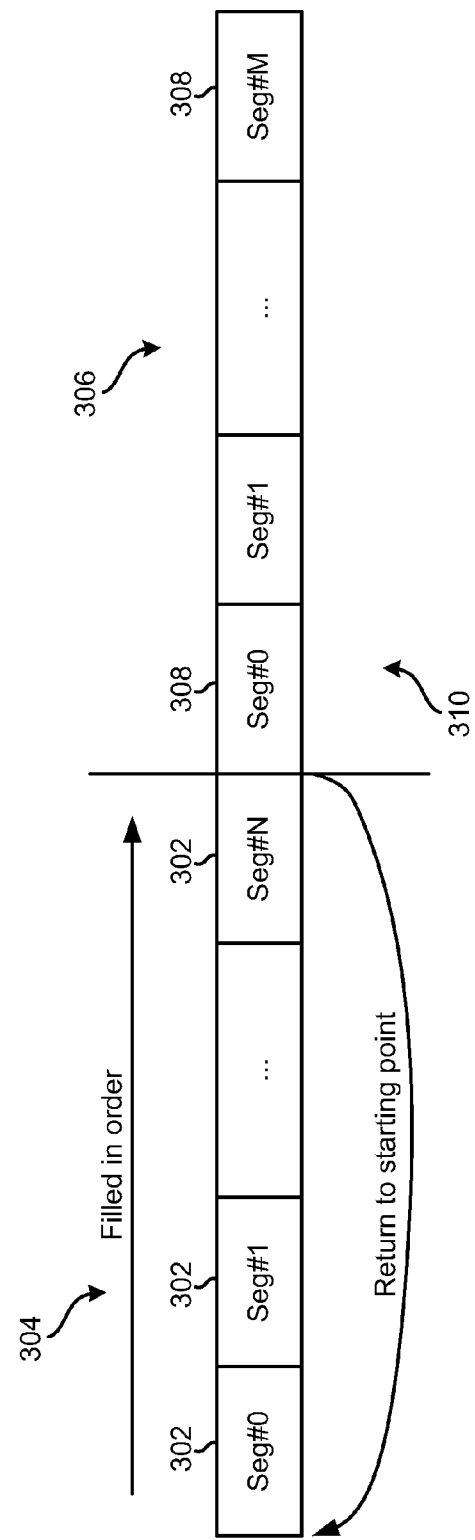

DYNAMIC BUFFER SIZE SWITCHING FOR BURST ERRORS ENCOUNTERED WHILE READING A MAGNETIC TAPE

BACKGROUND

The present invention relates to data storage, and more particularly, to providing dynamic buffer size switching for burst errors encountered while reading a magnetic tape.

When an error burst (a burst of errors that occurs within a predetermined distance on a magnetic tape) is encountered while reading data from the magnetic tape, there are several different methods of attempting to handle the error burst. One method is "Reconstructive Error Recovery Procedure (ERP) Using Reserved Buffer," which is described in more detail in U.S. patent application Ser. No. 13/676,477, filed Nov. 14, 2012, which is herein incorporated by reference. This method uses a reconstructive ERP to reduce backhitches during error burst scenarios, and is referred to herein as C/P ERP Single.

Another such method is referred to as an "Iterative Cut and Paste Error Recovery Procedure" (C/P ERP Multi), which is described in more detail in U.S. patent application Ser. No. 13/676,493, filed Nov. 14, 2012, which is herein incorporated by reference. This method attempts to solve burst reading errors for a tape drive reading a magnetic tape. However, the C/P ERP Multi uses a dedicated buffer area of a predetermined size, which is allocated regardless of other performance concerns (such as whether the tape drive has detected an error burst or not). Therefore, this usage of the dedicated buffer causes performance degradation for normal reading.

C/P ERP Multi typically utilizes a ring buffer of a type known in the art. The tape drive has a buffer memory which is divided and allocated to each segment and is referred to as a ring buffer because data is stored in the buffer from a starting point to an end point, and when more data needs to be stored, the starting point is again utilized (possibly overwriting data already stored therein). A tape drive reads/writes the data from/to magnetic tape media in units referred to as 'data sets' and stores each data set into each segment. Segments are filled from top to bottom and back to top, repeatedly.

Each data set is encoded using interleaved sets of codewords that are organized into an ECC-encoded matrix of size M bytes×N bytes (M×N) and then written to tape as shown in FIG. 1, according to the prior art. There are two levels of encoding within this matrix 150. The first level of encoding utilizes the matrix rows 102. Each row 102 of the matrix contains C1-ECC row parity 106, which adds p-bytes of C1-ECC to the n-bytes of user data (e.g., N=n+p bytes). The second level of encoding, C2-ECC column parity 108, adds q-bytes of C2-ECC to each matrix column 104. For example, if q=12, then adding 12 bytes of C2-ECC would add 12 rows to the matrix 150 (e.g., M=m+q bytes).

However, many temporary errors may occur during reading of data from the tape media. One such condition is called a "temp burst" (comprising a plurality of temporary errors within a predetermined distance on the magnetic tape). Under a temp burst condition, a tape drive may not be able to correct all errors encountered while reading the data from the tape in a predetermined amount of time, and reports these errors as one or more permanent errors. For example, when the data set is read from the tape in a high error rate condition, C1/C2 ECC is not capable of correcting the read data. For example, in some approaches, C1-encoding is capable of correcting 10 bytes of error, and C2-encoding is capable of correcting 20 bytes of error. If the error bytes exceed this correction power, then data cannot be read from the tape. In this scenario, the tape drive will then attempt ERP to read the data set from the tape again with a different hardware setting (e.g., changing the tape speed). ERP repeats until C1/C2-encoding is able to correct the data or until the ERP retry count exceeds a threshold. If the retry count exceeds the threshold, then the tape drive will report a permanent error for the read operation.

To solve this issue, C/P ERP Multi has been used in tape drives. The C/P ERP Multi improves performance under a temp burst condition; however, the procedure utilizes a portion of the reserved buffer area. The procedure divides the ring buffer into two portions and uses one of these portions for storing data during the C/P ERP Multi procedure. The other portion of the ring buffer remains accessible by the tape drive for normal operation (reading/writing). As a result, the normal or typical ring buffer size is reduced and the ordinary streaming read performance (read performance that is possible when no burst error occurs) is degraded.

The two methods of C/P ERP (single cut/paste or multi-cut/paste) are available to conventional tape drives and must be selected by the tape drive before reading data. The drive must examine dynamic recovery performance criteria to determine which technique, C/P ERP Multi or C/P Single, will be the more effective choice. In configuring the drive for C/P ERP Multi operation, the drive may choose a buffer segmentation ratio based on dynamic performance criteria.

BRIEF SUMMARY

In one embodiment, a system for dynamically allocating a ring buffer includes a processor and logic integrated with and/or executable by the processor, the logic configured to: read data from a data storage medium, detect an error condition in data read from the data storage medium, determine how to allocate the ring buffer into a first portion and a second portion, the ring buffer being allocated for processing normal read and/or write requests, divide the ring buffer into the first portion and the second portion, wherein the first portion is allocated for processing normal read and/or write requests, and wherein the second portion is allocated for processing error recovery procedure (ERP) requests, perform ERP on the data read from the data storage medium that is experiencing the error condition using the second portion of the ring buffer, determine that the ERP has been completed, and unify the ring buffer after the ERP is completed and allocate an entirety of the ring buffer for processing normal read and/or write requests.

According to another embodiment, a method for dynamically allocating a ring buffer includes reading data from a data storage medium, detecting an error condition in data read from the data storage medium, determining how to allocate the ring buffer into a first portion and a second portion, the ring buffer being allocated for processing normal read and/or write requests, dividing the ring buffer into the first portion and the second portion, wherein the first portion is allocated for processing normal read and/or write requests, and wherein the second portion is allocated for processing ERP requests, performing ERP on the data read from the data storage medium that is experiencing the error condition using the second portion of the ring buffer, determining that the ERP has been completed, and unifying the ring buffer after the ERP is completed and allocating the entirety of the ring buffer for processing normal read and/or write requests.

In yet another embodiment, a computer program product for dynamically allocating a ring buffer includes a computer readable storage medium having program code embodied therewith, the program code readable/executable by a tape drive to: read, by the tape drive, data from a data storage medium, detect an error condition in data read from the data storage medium, determine how to allocate the ring buffer into a first portion and a second portion, the ring buffer being allocated for processing normal read and/or write requests, divide the ring buffer into the first portion and the second portion, wherein the first portion is allocated for processing normal read and/or write requests, and wherein the second portion is allocated for processing ERP requests, perform ERP on the data read from the data storage medium that is experiencing the error condition using the second portion of the ring buffer, determine that the ERP has been completed, and unify the ring buffer after the ERP is completed and allocate the entirety of the ring buffer for processing normal read and/or write requests.

Other aspects and embodiments of the present invention will become apparent from the following detailed description, which, when taken in conjunction with the drawings, illustrates by way of example the principles of the invention.

BRIEF DESCRIPTION OF THE SEVERAL VIEWS OF THE DRAWINGS

FIG. 3A shows a ring buffer during normal reading/writing operations, according to one embodiment.

FIG. 3B shows a ring buffer for use in an iterative cut and paste error recovery procedure (C/P ERP Multi), according to one embodiment.

DETAILED DESCRIPTION

Figure 1:
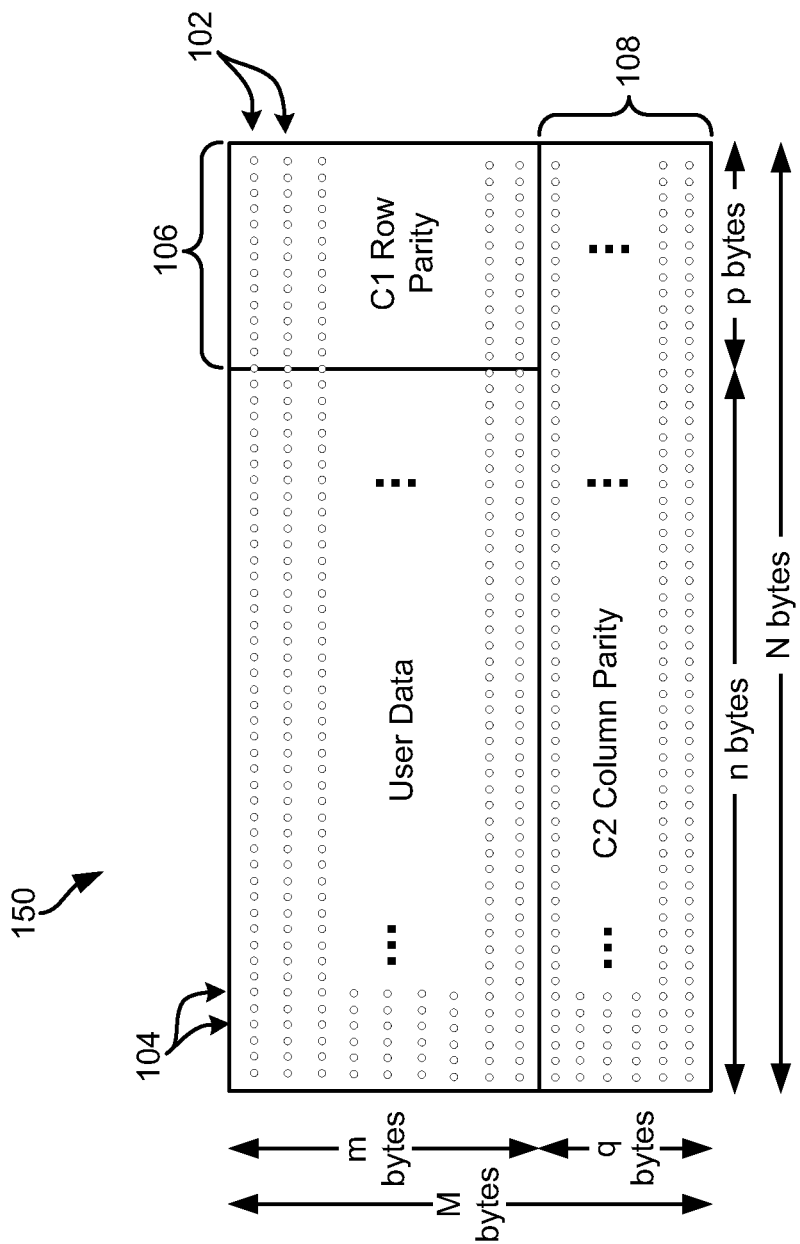
FIG. 1 shows a data set matrix or array, according to the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a system for dynamically allocating a ring buffer includes a processor and logic integrated with and/or executable by the processor, the logic configured to: read data from a data storage medium, detect an error condition in data read from the data storage medium, determine how to allocate the ring buffer into a first portion and a second portion, the ring buffer being allocated for processing normal read and/or write requests, divide the ring buffer into the first portion and the second portion, wherein the first portion is allocated for processing normal read and/or write requests, and wherein the second portion is allocated for processing error recovery procedure (ERP) requests, perform ERP on the data read from the data storage medium that is experiencing the error condition using the second portion of the ring buffer, determine that the ERP has been completed, and unify the ring buffer after the ERP is completed and allocate an entirety of the ring buffer for processing normal read and/or write requests.

According to another general embodiment, a method for dynamically allocating a ring buffer includes reading data from a data storage medium, detecting an error condition in data read from the data storage medium, determining how to allocate the ring buffer into a first portion and a second portion, the ring buffer being allocated for processing normal read and/or write requests, dividing the ring buffer into the first portion and the second portion, wherein the first portion is allocated for processing normal read and/or write requests, and wherein the second portion is allocated for processing ERP requests, performing ERP on the data read from the data storage medium that is experiencing the error condition using the second portion of the ring buffer, determining that the ERP has been completed, and unifying the ring buffer after the ERP is completed and allocating the entirety of the ring buffer for processing normal read and/or write requests.

In yet another general embodiment, a computer program product for dynamically allocating a ring buffer includes a computer readable storage medium having program code embodied therewith, the program code readable/executable by a tape drive to: read, by the tape drive, data from a data storage medium, detect an error condition in data read from the data storage medium, determine how to allocate the ring buffer into a first portion and a second portion, the ring buffer being allocated for processing normal read and/or write requests, divide the ring buffer into the first portion and the second portion, wherein the first portion is allocated for processing normal read and/or write requests, and wherein the second portion is allocated for processing ERP requests, perform ERP on the data read from the data storage medium that is experiencing the error condition using the second portion of the ring buffer, determine that the ERP has been completed, and unify the ring buffer after the ERP is completed and allocate the entirety of the ring buffer for processing normal read and/or write requests.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2A:
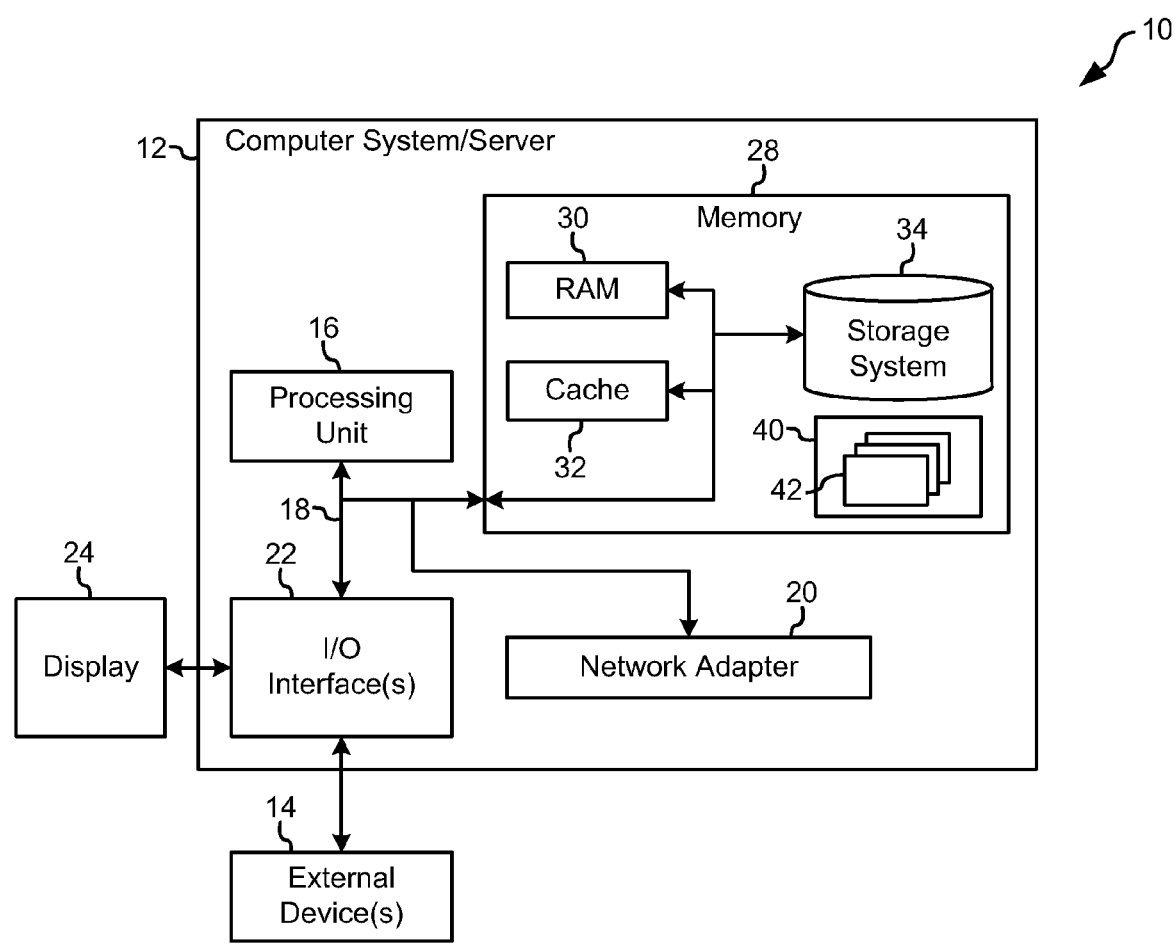
FIG. 2A illustrates a network storage system, according to one embodiment.

Referring now to FIG. 2A, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2A, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2B:
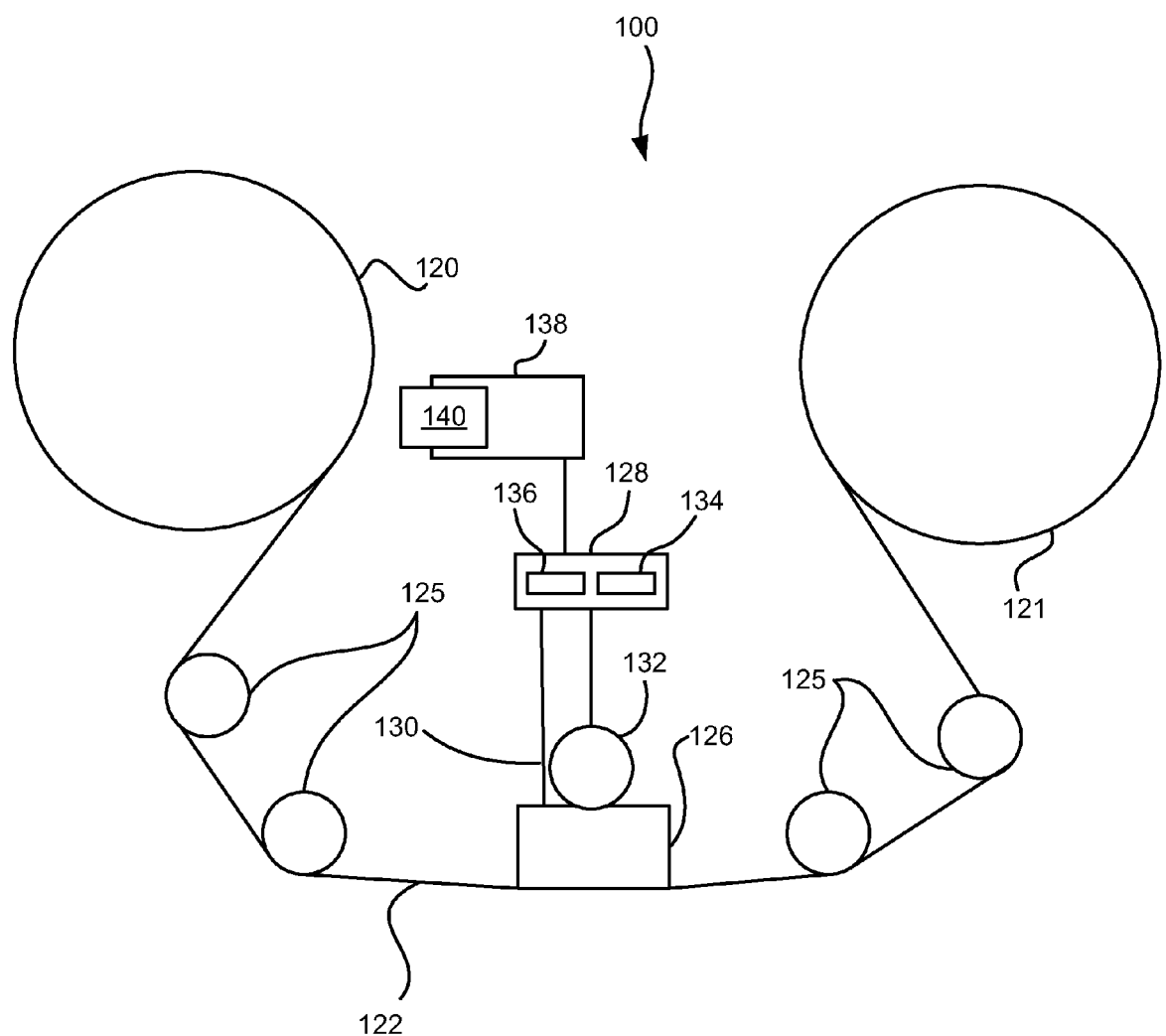
FIG. 2B illustrates a simplified tape drive of a tape-based data storage system, according to one embodiment.

FIG. 2B illustrates a simplified tape drive 100 of a tape-based data storage system, which may be employed according to various embodiments. While one specific implementation of a tape drive is shown in FIG. 2B, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the tape drive 100. The tape drive 100, such as that illustrated in FIG. 2B, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically comprises a servo channel 134 and data channel 136 which includes data flow processing. It controls reel motion (not shown in FIG. 2B) and head functions, such as track following, writing, reading, etc. The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

In one embodiment, the tape drive 100 may comprise a data buffer 138 which is accessible by the tape drive 100 and the controller 128. This data buffer 138 may be organized as a ring buffer and may be split into one or more portions, with one portion being a reserved data buffer 140, which may also be organized into a ring buffer, to be used for storage of partial data sets during reading operations from the tape 122.

An interface may also be provided for communication between the tape drive 100 and a host (integral or external) to send and receive the data and for controlling the operation of the tape drive 100 and communicating the status of the tape drive 100 to the host, as would be understood by one of skill in the art.

Performance degradation as a result of streaming data read from a data storage medium and keeping current performance of temp burst correction while performing a "Cut and Paste Error Recovery Procedure Multi" (C/P ERP Multi), as discussed previously, may be mitigated and/or eliminated according to systems, methods, and computer program products described herein according to various embodiments.

Referring now to FIG. 3, a buffer memory 300 is shown which may be organized as a ring so that it never runs out of space, data storage just loops back to the beginning of the ring buffer 300 when the last segment 302 is filled with data. Data transferred between the tape drive and a host is stored to the ring buffer 300 and a tape drive is able to provide a certain level of performance based on a size of the ring buffer 300 available to the tape drive.

Data read from tape media is stored in a buffer memory (ring buffer) 300 in segments 302 (such as Seg#0, Seg#1, Seg#2, . . . , Seg#N). The ring buffer 300 is divided and allocated in segments 302 and is referred to as a ring buffer because data is stored in the ring buffer 300 from a starting point (Seg#0) to an end point (Seg#N), and when more data needs to be stored, the starting point is again utilized (possibly overwriting data already stored therein which has already been stored in another location). A tape drive reads/writes the data from/to magnetic tape media in units referred to as "data sets," each data set capable of storing multiple records. The tape drive stores the data sets into the segments 302, one data set per segment 302. Segments 302 are filled from top to bottom and back to top, repeatedly as needed.

The tape drive adjusts the reading speed (the rate at which data is read from the magnetic tape media) according to host speed (in this case, a rate at which the host is able to consume/receive such data). Transferred data from the host is also stored in the ring buffer 300 and the tape drive also adjusts the writing speed (the rate at which data is written to the magnetic tape media) according to the host speed (in this case, a rate at which the host is able to send such data).

Of course, this ring buffer 300 may be used with other types of data storage media and media reading/writing devices as would be understood by one of skill in the art. However, for the sake of these descriptions, a magnetic tape medium and a tape drive are assumed.

When a size of the ring buffer 300 is larger, more data is able to be read from the tape media even if the host speed is not fast enough to keep up with the amount of data being read from the tape. More data also may be received from the host (and stored to the ring buffer) with the larger ring buffer size if the host speed is faster than the tape drive is capable of writing data to the tape media. Therefore, a larger ring buffer size allows for tape speed to be adjusted in order to host data more easily and contributes to improved overall performance of the tape drive whether reading or writing data.

Now referring to FIG. 3B, in traditional C/P ERP Multi, a ring buffer 310 is permanently split into two portions, with a first portion 304 having a plurality of segments 302 being reserved for use in normal read/write operation, while the second portion 306 having a plurality of segments 308 is reserved for use in error burst correction. Traditionally, the ring buffer 310 is split in half, with 50% of the memory being allocated to the first portion 304 and 50% of the memory being allocated to the second portion 306. The ring buffer 310 is then utilized in this condition, even when performing normal read/write operations (operations that are unaffected by a temp burst or other error condition).

This permanent allocation of the ring buffer 310 for traditional C/P ERP Multi reduces the capacity for normal read/write operations for the ring buffer 310 because when host data is being read, it is pushed into the first portion 304 of the ring buffer 310 and the speed at which the host is pulling data out is optimized according to the size of the ring buffer 310 (in this case, only the first portion 304 of the ring buffer 310), and the speed at which the tape drive is filling the first portion 304 of the ring buffer 310 with data.

As this figure shows, the size of the portion 304 of the ring buffer 310 used in normal read/write operation is reduced in order to attempt to correct a temp burst condition using C/P ERP Multi in the second portion 306, even when a temp burst is not occurring or has not occurred. When this reduction in ring buffer 310 size occurs, the normal tape reading/writing operation performance suffers due to the smaller size of the ring buffer 310 (which is now the size of first portion 304).

When the second portion 306 of the buffer is reserved for C/P ERP Multi processing, the performance potential of the ring buffer 310 for normal read/write operations is reduced, because the size of the usable portion 304 of the ring buffer 310 is less than the total size of the ring buffer 310.

Figure 4:
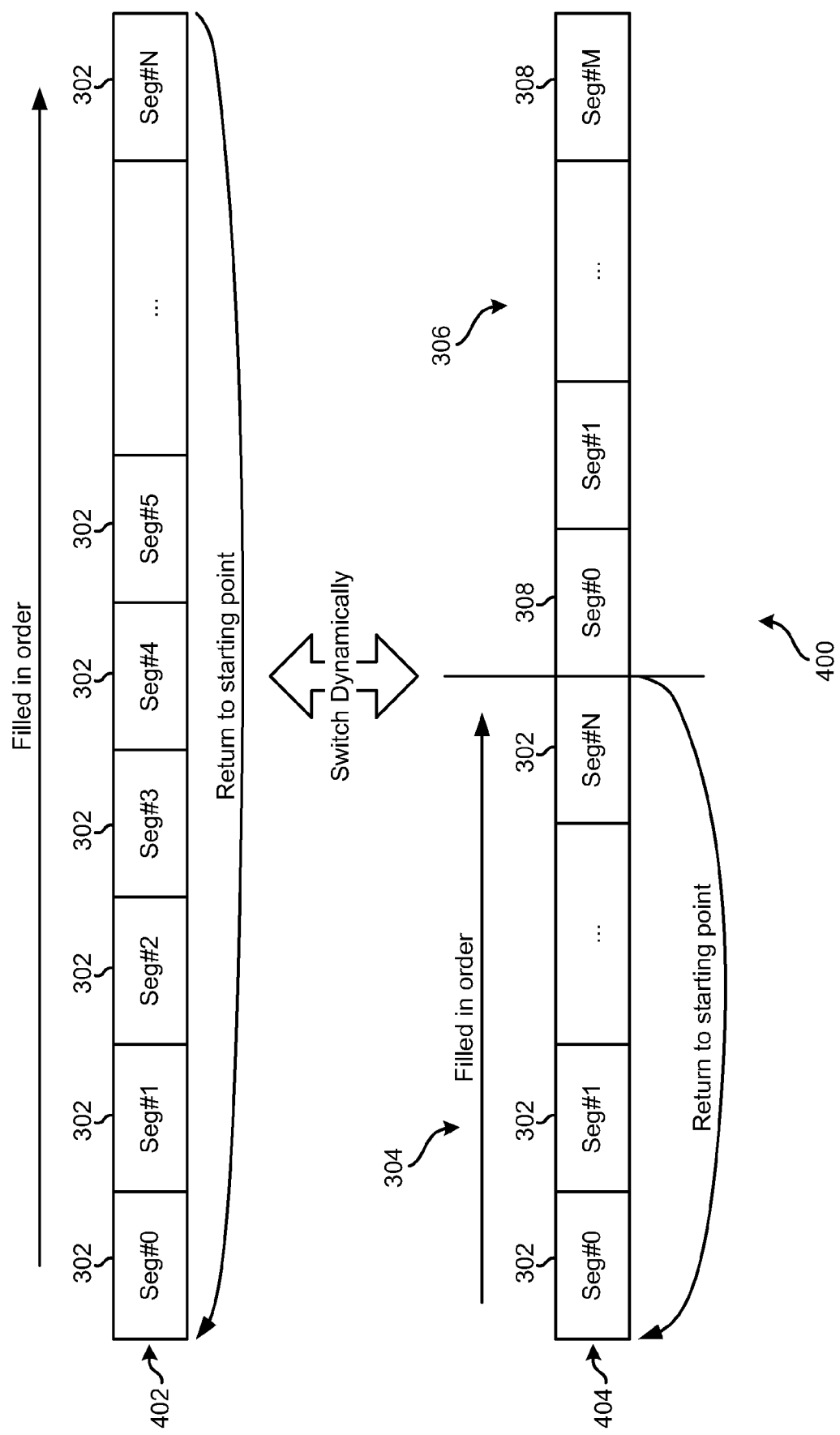
FIG. 4 shows a dynamically allocated ring buffer, according to one embodiment.

With reference to FIG. 4, a dynamically allocated ring buffer 400 is shown according to one embodiment. This dynamically allocated ring buffer 400 is configured to dynamically switch between a state 402 in which the entire dynamically allocated ring buffer 400 is divided into segments 302 and operates as described with reference to ring buffer 300 in FIG. 3A.

Then, in response to a temp burst condition being detected, reported, determined, or otherwise existing, the dynamically allocated ring buffer 400 transitions into a second state 404 in which the dynamically allocated ring buffer 400 is divided into a first portion 304 and a second portion 306. The first portion 304 comprises a plurality of segments 302 used for normal read/write operations. The second portion 306 comprises a plurality of segments 308 reserved for use in error burst correction (such as C/P ERP Multi or some other error correction process known in the art which may make use of ring buffer space).

In contrast to normal divided ring buffer operation, as described in FIG. 3B, the dynamically allocated ring buffer 400 described in FIG. 4 is capable of transitioning between the states 402 and 404 whenever it is beneficial for data processing/data storage to the dynamically allocated ring buffer 400. That is to say, the dynamically allocated ring buffer 400 may utilize all of its memory in a ring buffer manner in state 402, storing data sets to segments 302 thereof from front to back, top to bottom, in a ring-like fashion during normal read/write operations. Then, when a temp burst (or some other error condition which may benefit from an error correction process which needs buffer space to operate) is detected, the dynamically allocated ring buffer 400 is transitioned to the second state 404 and provides memory for both normal read/write operations in segments 302 of the first portion 304 and error correction processing in segments 308 of the second portion 306, according to one embodiment.

In another embodiment, the dynamically allocated ring buffer 400 may be split into more than two portions, such as three portions, four portions, etc., in order to provide memory for other types of processing, as would be understood by one of skill in the art or as would be useful to applications or operations which utilize the ring buffer 400. Each portion may operate as a ring buffer or as general buffer storage individual of the other portions, in various approaches.

Also in contrast to traditional ring buffers, the dynamically allocated ring buffer 400 is configured to be split into a first portion 304 and a second portion 306 in any advantageous manner, such as 25% first portion 304/75% second portion 306, 33/67, 40/60, 50/50, 67/33, 60/40, 75/25, etc., according to various embodiments. Of course, any other conceivable split where the percentages of memory allocated to the particular portions add up to 100% may be performed, as would be understood by one of skill in the art upon reading the present descriptions.

Figure 5:
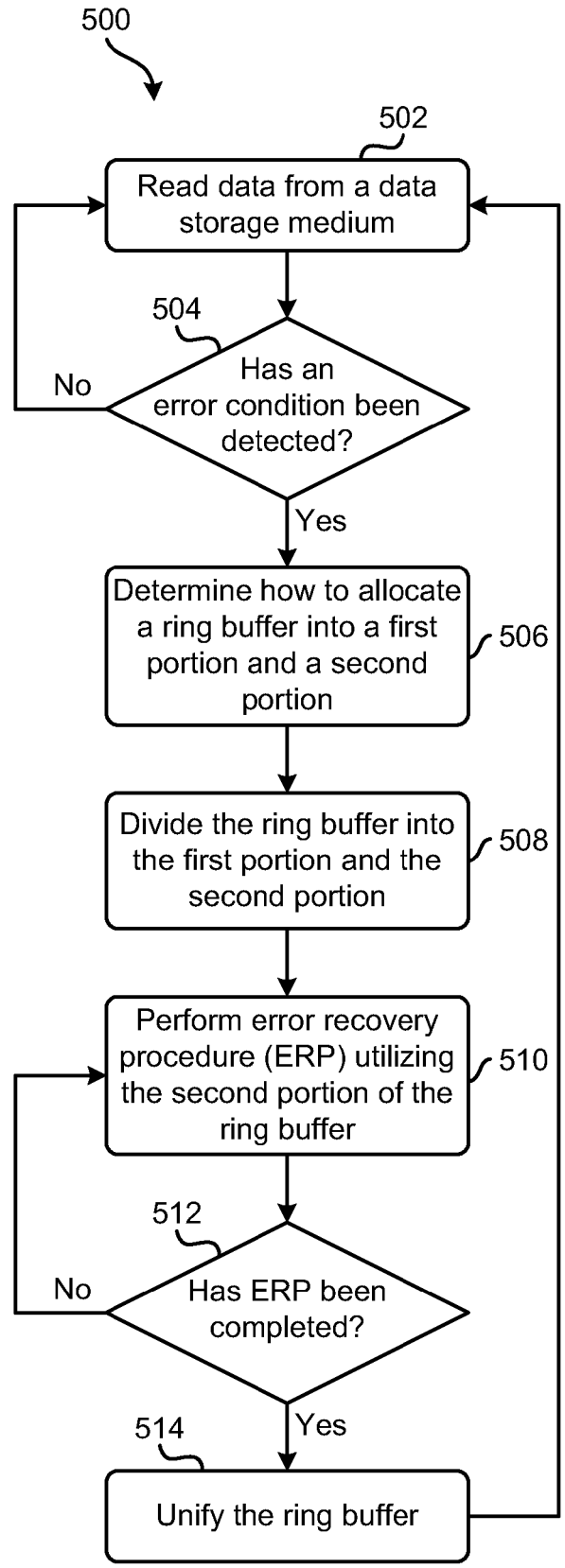
FIG. 5 is a flowchart of a method according to one embodiment.

Now referring to FIG. 5, a method 500 for providing a ring buffer is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various non-limiting embodiments, the method 500 may be partially or entirely performed by a tape drive, a hard disk drive, an optical drive, a processor (such as a CPU, an ASIC, a FPGA, etc.) which may be embedded in and/or operate within a system, etc.

As shown in FIG. 5, method 500 may initiate with operation 502, where data is read from a data storage medium. In one approach, the data storage medium may be a magnetic tape. In other approaches, it may be an optical disk, a hard disk, or any other suitable data storage medium or device.

In operation 504, it is determined whether an error condition is detected in data read from the data storage medium. If an error condition is detected, the method 500 proceeds to operation 506; otherwise, the method 500 returns to normal data reading in operation 502.

In one embodiment, the error condition may be a burst of temporary errors (temp burst) comprising a plurality of detected errors within a predetermined distance on the magnetic tape or some other data storage medium. This error burst may be specifically corrected by a particular ERP known as C/P ERP Multi, which is an iterative cut and paste error recovery procedure as described herein in more detail.

In one embodiment, method 500 may only proceed to operation 506 when the error condition is a temp burst. Otherwise, the method 500 returns to operation 502 to continue reading data. The detected error condition may be handled using conventional ERP techniques not described herein, but known in the art when the error condition is not a temp burst, according to this embodiment.

In operation 506, it is determined whether to use C/P ERP Multi and how to split a ring buffer for use thereof during C/P ERP Multi. For example, when the error condition is a temp burst, C/P ERP Multi may be determined to be most beneficial to resolving the errors. Switching from C/P ERP Single mode to C/P ERP Multi mode may be primarily based on a decision that an elapsed time needed to perform a C/P ERP Multi session will be significantly shorter than an elapsed time needed to perform ongoing C/P ERP Single sessions in a region of tape experiencing a high temp rate.

In one embodiment, a calculation for determining an amount of time needed to perform C/P ERP Multi, $T_n$, for a number of data sets, n, may be performed according to the following equation:

$$T_n = (4 \cdot V/A + 2 \cdot l \cdot n/V) \cdot R$$

In this equation, V is velocity of the tape movement, A is the accelerated velocity of the tape movement, l is the length on tape of one data set, R is the retry count before error correction is completed, n is the number of data sets that C/P ERP multi is being attempted on. Therefore, n is also related to a number of segments needed in the portion of the ring buffer being used for the C/P ERP Multi.

Figure 6:
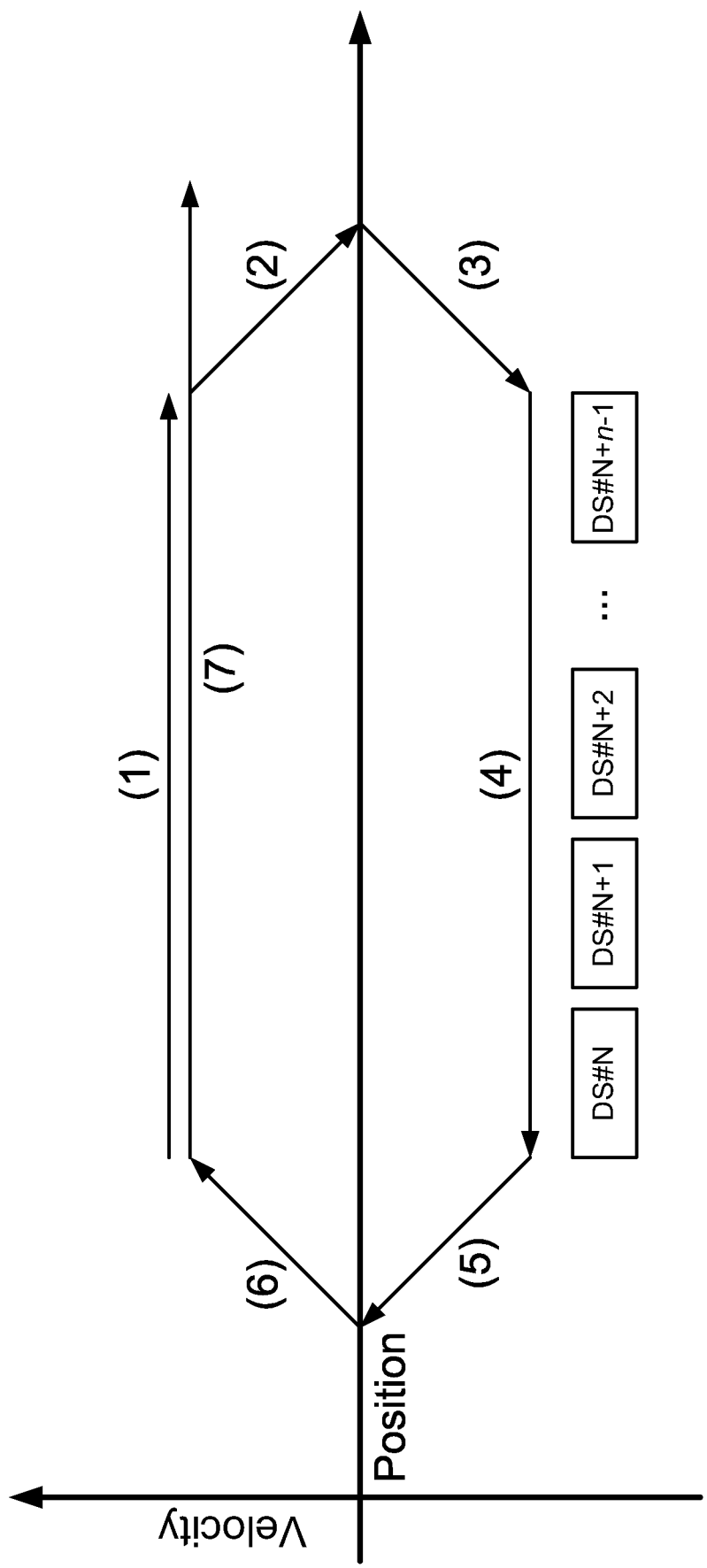
FIG. 6 shows tape velocity versus a position on the tape for each step in a process of retrying data set reads, according to one embodiment.

The step motion for the above described equation to determine the amount of time needed to perform C/P ERP Multi on n data sets, $T_n$, may proceed as described below. Referring to FIG. 6, the tape velocity versus the position on the tape is shown for each step in this process of retrying data set reads from DS#N to DS#N+n−1. Each number relates to one of the steps in the process, as marked by numbers in parenthesis in the description.

First, n datasets are read through (1), and if an error happens at DS#N and DS#N+2, then C/P ERP Multi is started from DS#N. Next, the elapsed time counting starts, as the tape is backhitched N data sets (2, 3, 4, 5) in preparation of reading the data sets again. The elapsed time for these steps may be calculated as $4 \cdot V/A + l \cdot n/V$, which is equivalent to the amount of time needed to backhitch plus the time to back up n data sets. Then, the n data sets are read through again (6, 7), and an amount of time needed to perform this step is calculated as $l \cdot n/V$. When the error correction does not complete, then the tape is backhitched n data sets and reading is retried. For each retry, the retry count, R, which starts at zero, is incremented by one.

Therefore, the estimated maximum time needed to perform C/P ERP Multi for n data sets, $T_n$, is calculated as the amount of time needed to backhitch plus two times the time needed to read n data sets, times the amount of retries, $T_n = (4 \cdot V/A + 2 \cdot l \cdot n/V) \cdot R$.

Figure 7:
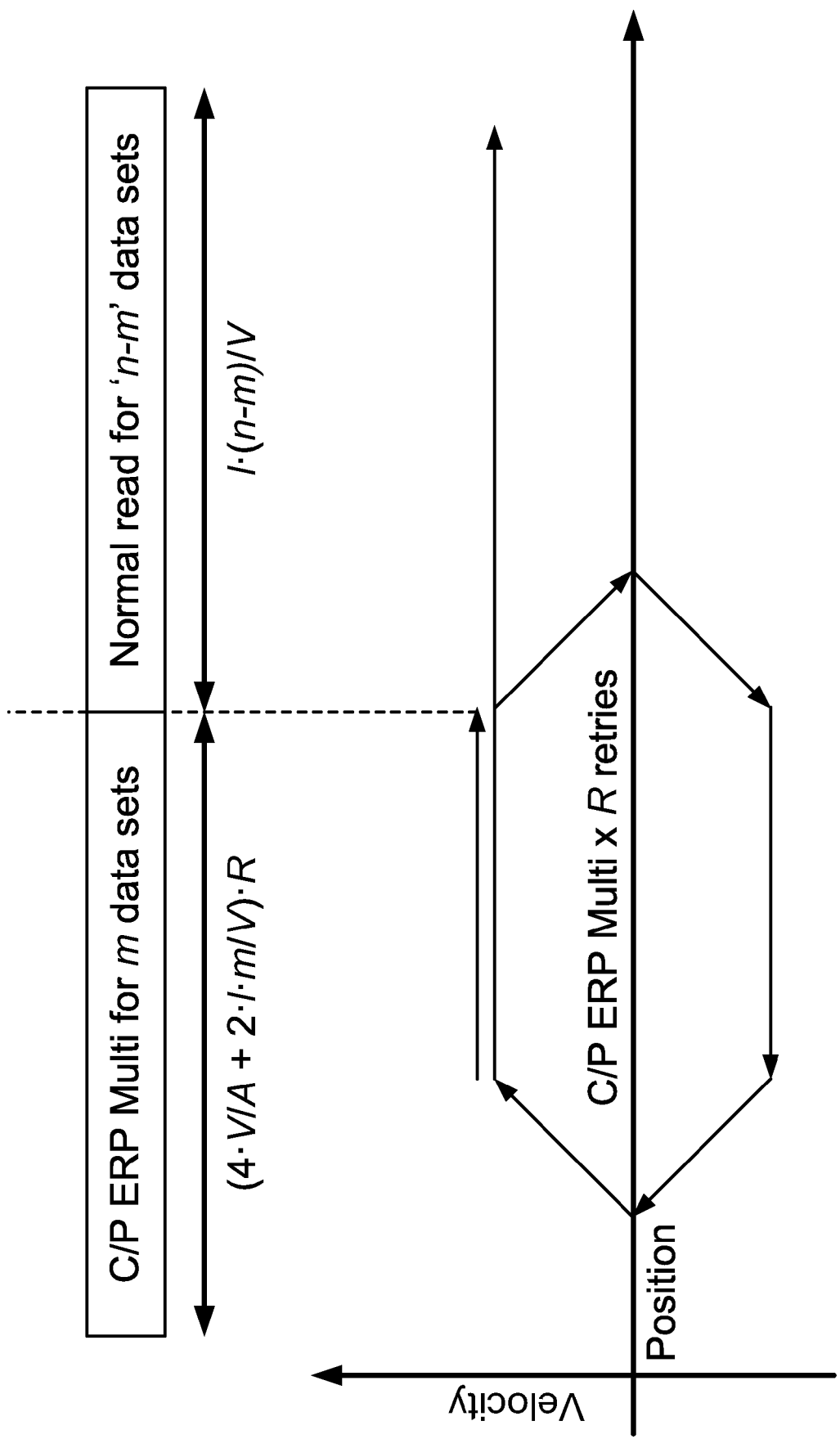
FIG. 7 shows tape velocity versus a position on the tape for steps in a more efficient process of retrying data set reads, according to one embodiment.

With reference to FIG. 7, when the error condition and the count is estimated and it is less than n, then the elapsed time needed to perform error correction will be less by performing C/P ERP multi for m data sets (m<n) and the rest of the data sets are read normally. If C/P ERP Multi is performed for m data sets, then the estimated time to perform ERP for m data sets, $T_m$, is defined as below.

$$T_m = (4 \cdot V/A + 2 \cdot l \cdot m/V) \cdot R + l \cdot (n-m)/V$$

In this case, the number of data sets reread, m, is also equal to the number of segments needed in the portion of the ring buffer used for C/P ERP.

The elapsed time needed to perform C/P ERP for n data sets versus m data sets, $T_n - T_m$, may be calculated according to the following equation:

$$T_n - T_m = (4 \cdot V/A + 2 \cdot l \cdot n/V) \cdot R (4 \cdot V/A + 2 \cdot l \cdot m/V) \cdot R + l \cdot (n-m)/V$$

This equation may be simplified to $1/V \cdot (n-m) \cdot (2R-1)$. If n−m>0 and R>0, then $1/V \cdot (n-m) \cdot (2R-1) > 0$. Therefore, the elapsed time needed to perform C/P ERP for n data sets, $T_n$, is always greater than the time needed to perform C/P ERP for m data sets, $T_m$.

For example, the elapsed time needed for C/P ERP may be calculated as shown below under the following conditions: V=8.473 [m/sec], A=10 [m/sec/sec], l=0.7 [m], n=100, m=50, and R=3.

$$T_n = (8.473/10*4 + 2*0.7*100/8.473)*3 = 59.73 \text{ [sec]}$$

$$T_m = (8.473/10*4 + 2*0.7*50/8.473)*3 + 0.7*(100-50)/8.473 = 39.08 \text{ [sec]}$$

Therefore, as this case study further supports, the time needed to perform C/P ERP for n data sets, $T_n$, is greater than the time needed to perform C/P ERP for m data sets, $T_m$.

Of course, the determination of the elapsed time needed to perform the two different C/P ERP techniques may alternately be performed using any suitable conventional approximation technique known in the art, in other approaches.

However, in addition to deciding whether to use C/P ERP Multi instead of C/P ERP Single or some other ERP technique based on the error condition, the actual division of the ring buffer is also determined. In this process, how many portions to create (typically two portions) and the actual number of segments to allocate to each portion of the ring buffer is determined. In accordance with another example, a divide ratio (e.g., 50:50, 60:40, 70:30, 20:80, etc.) may be determined for the ring buffer, such that the ring buffer is split into two portions (or more, where the divide ratio could be 20:60:20, 40:50:10, 10:20:50:20, etc.) and segments are allocated to each portion according to the divide ratio.

Figure 8:
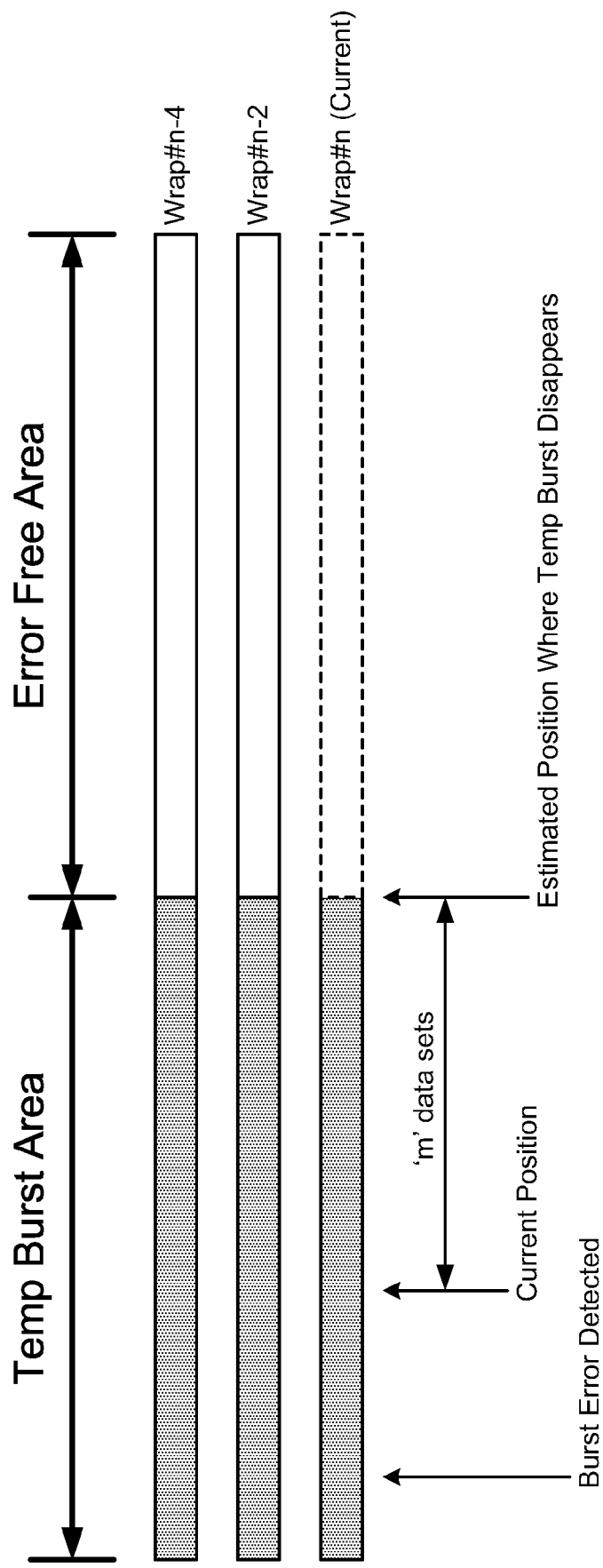
FIG. 8 shows a tape experiencing a "temp burst" and how a tape drive may estimate how many error counts will continue using adjacent wrap information. according to an exemplary embodiment.
Figure 9:
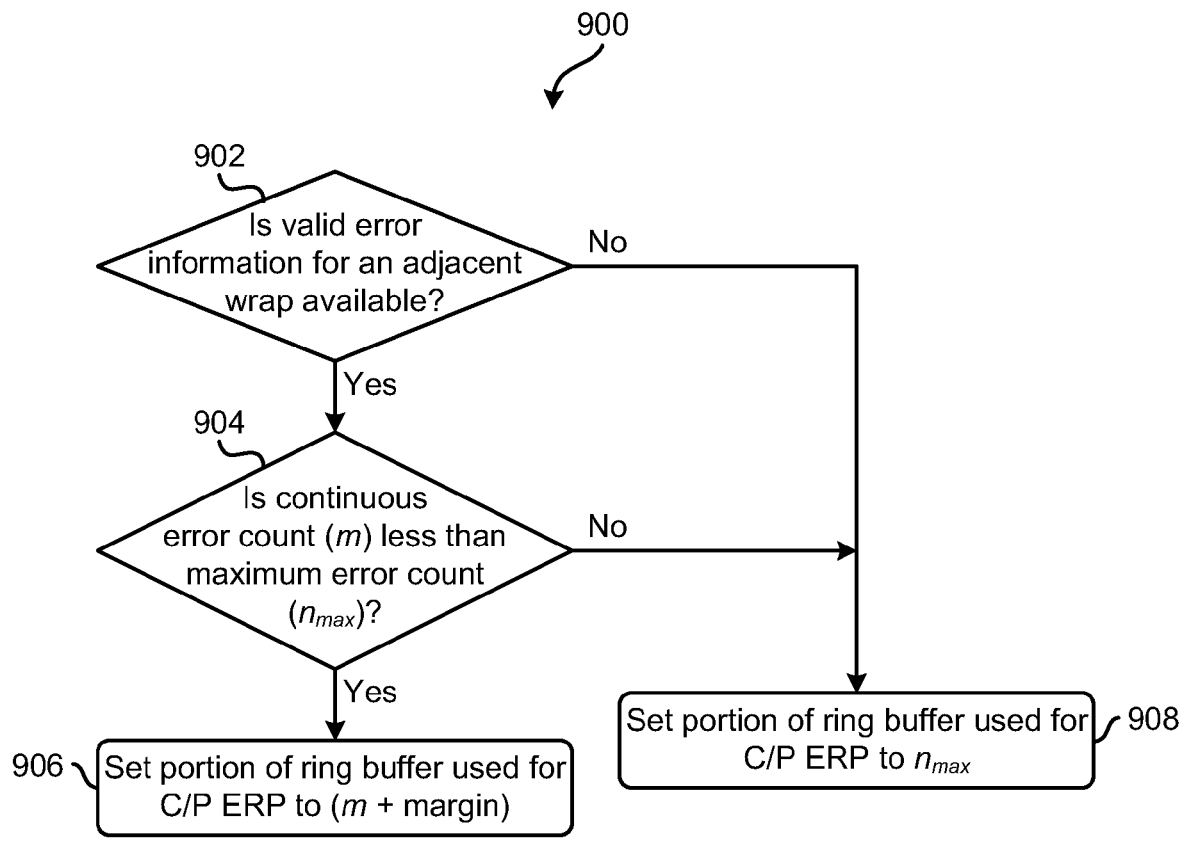
FIG. 9 shows a method for determining how a number of segments may be split amongst portions of a ring buffer, in one embodiment.

Now referring to FIG. 8, a tape drive may estimate how many error counts will continue using adjacent wrap information. Because tape media exhibits similar error trends on the same physical area. If the tape drive has valuable error information and is capable of estimating the continuous error count and this count is less than a current segment number of the portion of ring buffer used for C/P ERP, then the ring buffer may be split to provide less segments to the portion used for C/P ERP, which in turn may result in less elapsed time needed to perform C/P ERP. FIG. 9 shows a method 900 for determining how the number of segments are split amongst the portions of the ring buffer, in one embodiment.

In operation 902, it is determined whether valid error information is available for an adjacent wrap of a current wrap which is experiencing an error condition. If this valid error information for an adjacent wrap is available, such as to the tape drive, the method 900 continues to operation 904; otherwise, method 900 continues to operation 908.

In operation 904, it is determined whether a continuous error count (m) is less than a maximum error count ($n_{max}$), e.g., $m<n_{max}$, with $n_{max}$ being limited, in one embodiment, to one half of the total number of segments in the ring buffer. If this condition is met, method 900 continues to operation 906; otherwise, method 900 continues to operation 908.

In operation 906, the portion of the ring buffer used for C/P ERP is set to include a number of segments capable of storing m data sets. Additionally, in some approaches, a margin may be included, such as 5% of m, 10% of m, etc., to account for eventualities, write errors, miscalculations, etc.

In operation 908, the portion of the ring buffer used for C/P ERP is set to include a number of segments capable of storing $n_{max}$ data sets.

The maximum number of segments, $n_{max}$, that may be allocated to the portion used for C/P ERP is one half of the total number of segments in the ring buffer in some approaches, due to a design constraint in some tape drives. Of course, $n_{max}$ may be adjusted, if normal reading may occur with less segments than half of the total number, as determined by the tape drive or some other algorithm. By using less than the maximum number of segments, $n_{max}$, in the portion of the ring buffer allocated for C/P ERP, the time needed to correct the error is reduced because n>m, and therefore the time needed to backhitch and reread n data sets is always greater than the time needed to backhitch and reread m data sets.

Referring again to FIG. 5, in one embodiment, prior to operation 508 but after an error condition (or more specifically a temp burst) is detected, contents of a ring buffer may be flushed, such that the ring buffer may be repurposed. If the ring buffer is already empty or already being used for correcting an error condition, this operation may be skipped or altered. When the ring buffer is being used for normal read and/or write requests, an entirety of the ring buffer is allocated for processing the normal read and/or write requests. Only when an error condition is detected does the ring buffer undergo changes, as described in operation 508.

In operation 508, the ring buffer is divided into a first portion and a second portion. The first portion is allocated for processing normal read and/or write requests, while the second portion is allocated for processing ERP requests.

In one embodiment, relative sizes of the first and second portions of the ring buffer may be determined based on at least a size of the temp burst, along with any other relevant and/or suitable factors or parameters, such as a total amount of buffer memory available, a rate at which data is being read from/written to the data storage medium, a rate at which data is being read from/written to the ring buffer, etc.

In a further embodiment, a size of the ring buffer may be increased or decreased when it is divided into two portions depending on at least a size of the temp burst and/or any other relevant or suitable factors as would be known by one of skill in the art.

In operation 510, ERP is performed on the data read from the data storage medium that is experiencing the error condition using the second portion of the ring buffer. In this way, temporary data may be stored to the ring buffer in order to allow for efficient processing of the ERP steps and recover the data from the data storage medium.

As described previously, in on embodiment, the ERP may be C/P ERP Multi.

In operation 512, it is determined whether the ERP has been completed or whether the ERP has not been completed. When the ERP has completed, the method 500 continues to operation 514; otherwise, the method 500 returns to operation 510 to continue or reattempt ERP, possibly using different parameters, settings, etc.

In one embodiment, ERP may be determined to have completed when it is determined that the data read from the data storage medium has errors therein that have been corrected to an acceptable threshold and it is determined that a predetermined amount of data has been read from the data storage medium correctly. By correctly, what is meant is that no errors, or possibly only a correctable amount of error is detected in the read data, e.g., without additional errors being detected.

In operation 514, the ring buffer is unified after the ERP is completed and the entirety of the ring buffer is allocated for processing normal read and/or write requests. In this way, the second portion of the ring buffer is dissolved and only the first portion remains for use in processing normal read and/or write requests.

According to one embodiment, the method 500 may be performed by a system. For example, the system may be configured for dynamically allocating a ring buffer, and the system may comprise a processor (such as a CPU, ASIC, FPGA, IC, etc.) and logic integrated with and/or executable by the processor. The logic may be hardware, software, or some combination thereof, and may be configured to execute one or more operations of method 500, and may be configured to perform additional functions not specifically described herein, in various approaches.

In another embodiment, a computer program product may be designed for dynamically allocating a ring buffer, the computer program product comprising a computer readable storage medium having program code embodied therewith. In one embodiment, the program code may be readable and/or executable by a device, such as a tape drive, processor, etc., to execute one or more operations of method 500, and may be configured to perform additional functions not specifically described herein, in various approaches.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system for dynamically allocating a ring buffer, the system comprising a processor and logic integrated with and/or executable by the processor, the logic configured to:
   read data from a data storage medium;
   detect an error condition in data read from the data storage medium;
   determine how to allocate the ring buffer into a first portion and a second portion, the ring buffer being allocated for processing normal read and/or write requests;
   divide the ring buffer into the first portion and the second portion, wherein the first portion is allocated for processing normal read and/or write requests, and wherein the second portion is allocated for processing error recovery procedure (ERP) requests;
   perform ERP on the data read from the data storage medium that is experiencing the error condition using the second portion of the ring buffer;
   determine that the ERP has been completed; and
   unify the ring buffer after the ERP is completed and allocate an entirety of the ring buffer for processing normal read and/or write requests.

2. The system as recited in claim 1, wherein the data storage medium is a magnetic tape.

3. The system as recited in claim 2, wherein the error condition is a burst of temporary errors (temp burst) comprising a plurality of detected errors within a predetermined distance on the magnetic tape.

4. The system as recited in claim 1, wherein the logic adapted to determine that the ERP has been completed comprises:
   determining that the data read from the data storage medium has errors therein corrected to an acceptable threshold; and
   determining that a predetermined amount of data is read from the data storage medium correctly.

5. The system as recited in claim 1, wherein the logic configured to determine how to allocate the ring buffer into the first portion and the second portion comprises determining relative sizes of the first portion and the second portion of the ring buffer based on at least a size of the error condition.

6. The system as recited in claim 1, wherein the logic is further configured to:
   flush contents from the ring buffer after the error condition is detected and prior to using the ring buffer for performing the ERP; and
   increase or decrease a size of the ring buffer depending on at least a size of the error condition.

7. The system as recited in claim 1, wherein the ERP is an iterative cut and paste error recovery procedure (C/P ERP Multi).

8. A method for dynamically allocating a ring buffer, the method comprising:
   reading data from a data storage medium;
   detecting an error condition in data read from the data storage medium;
   determining how to allocate the ring buffer into a first portion and a second portion, the ring buffer being allocated for processing normal read and/or write requests;
   dividing the ring buffer into the first portion and the second portion, wherein the first portion is allocated for processing normal read and/or write requests, and wherein the second portion is allocated for processing error recovery procedure (ERP) requests;
   performing ERP on the data read from the data storage medium that is experiencing the error condition using the second portion of the ring buffer;
   determining that the ERP has been completed; and
   unifying the ring buffer after the ERP is completed and allocating the entirety of the ring buffer for processing normal read and/or write requests.

9. The method as recited in claim 8, wherein the data storage medium is a magnetic tape.

10. The method as recited in claim 9, wherein the error condition is a burst of temporary errors (temp burst) comprising a plurality of detected errors within a predetermined distance on the magnetic tape.

11. The method as recited in claim 8, wherein the determining that the ERP has been completed comprises:
    determining that the data read from the data storage medium has errors therein corrected to an acceptable threshold; and
    determining that a predetermined amount of data is read from the data storage medium correctly.

12. The method as recited in claim 8, wherein the determining how to allocate the ring buffer into the first portion and the second portion comprises determining relative sizes of the first portion and the second portions of the ring buffer based on at least a size of the error condition.

13. The method as recited in claim 8, further comprising:
    flushing contents from the ring buffer after the error condition is detected and prior to using the ring buffer for performing the ERP; and
    increasing or decreasing a size of the ring buffer depending on at least a size of the error condition.

14. The method as recited in claim 8, wherein the ERP is an iterative cut and paste error recovery procedure (C/P ERP Multi).

15. A computer program product for dynamically allocating a ring buffer, the computer program product comprising a computer readable storage medium having program code embodied therewith, the program code readable/executable by a tape drive to:
    read, by the tape drive, data from a data storage medium;
    detect an error condition in data read from the data storage medium;
    determine how to allocate the ring buffer into a first portion and a second portion, the ring buffer being allocated for processing normal read and/or write requests;
    divide the ring buffer into the first portion and the second portion, wherein the first portion is allocated for processing normal read and/or write requests, and wherein the second portion is allocated for processing error recovery procedure (ERP) requests;
    perform ERP on the data read from the data storage medium that is experiencing the error condition using the second portion of the ring buffer;
    determine that the ERP has been completed; and
    unify the ring buffer after the ERP is completed and allocate the entirety of the ring buffer for processing normal read and/or write requests.

16. The computer program product as recited in claim 15, wherein the data storage medium is a magnetic tape, and wherein the error condition is a burst of temporary errors (temp burst) comprising a plurality of detected errors within a predetermined distance on the magnetic tape.

17. The computer program product as recited in claim 15, wherein the program code readable/executable by the tape drive to determine that the ERP has been completed is further readable/executable by the tape drive to:
    determine that the data read from the data storage medium has errors therein corrected to an acceptable threshold; and determine that a predetermined amount of data is read from the data storage medium correctly.

18. The computer program product as recited in claim 15, wherein the program code readable/executable by the tape drive to determine how to allocate the ring buffer into the first portion and the second portion comprises determining relative sizes of the first and second portions of the ring buffer based on at least a size of the error condition.

19. The computer program product as recited in claim 15, wherein the program code is further readable/executable by the tape drive to:
  flush contents from the ring buffer after the error condition is detected and prior to using the ring buffer for performing the ERP; and
  increase or decrease a size of the ring buffer depending on at least a size of the error condition.

20. The computer program product as recited in claim 15, wherein the ERP is an iterative cut and paste error recovery procedure (C/P ERP Multi).

* * * * *